Figure 1:
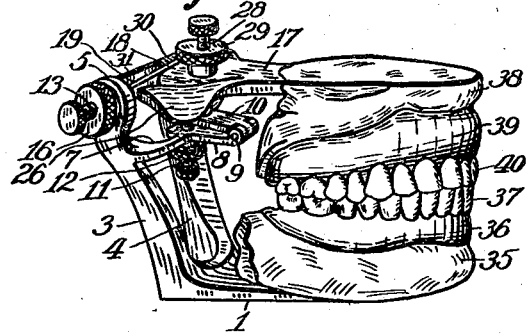

Dec. 2, 1924.

A. STANLEY

ANATOMICAL ARTICULATOR AND GRINDER

Filed Dec. 31, 1921

1,517,922

INVENTOR:
Albert Stanley,
BY
E. T. Silvius.
ATTORNEY.

Patented Dec. 2, 1924.

1,517,922

UNITED STATES PATENT OFFICE.

ALBERT STANLEY, OF INDIANAPOLIS, INDIANA.

ANATOMICAL ARTICULATOR AND GRINDER.

Application filed December 31, 1921. Serial No. 526,369.

*To all whom it may concern:*

Be it known that I, ALBERT STANLEY, a citizen of the United States, residing at Indianapolis, in the county of Marion and State of Indiana, have invented new and useful Anatomical Articulators and Grinders, of which the following is a specification, reference being had to the accompanying drawings, and to the letters and figures of reference marked thereon.

This invention relates to an anatomical articulator of the type that is designed to be used by dentists, the invention having reference more particularly to an articulator that is designed to have a wide range of movement, when associated with the practice of setting artificial teeth in their proper positions, permitting the dentist to accurately grind off uneven or protruding portions of artificial teeth.

An object of the invention is to provide an anatomical or dental articulator which shall be so constructed as to enable the dentist, after having mounted the upper and lower sets of teeth in the articulator, to obtain rotary movement on the plane of mastication with the ends of the teeth following the natural curve of the plane of mastication, in imitation of the natural grinding movements of human jaws, to the end that ideal results may be obtained in producing sets of artificial teeth.

Another object is to provide an articulator of the above-mentioned character which shall be of such construction as to facilitate the setting of artificial teeth in place, and permit the operator to rapidly and correctly operate the articulator for the purpose of testing the accuracy of teeth settings.

A further object is to provide a dental articulator which shall be so constructed as to enable the operator to quickly take impressions on the plane of mastication while the teeth are given grinding movements corresponding to the natural grinding movements of the human jaws, to determine whether or not grinding off of points may be necessary to obtain the best results by imitating nature in the fitting of the lower and upper teeth together.

A still further object is to provide an anatomical articulator which shall be so constructed that the operator may be enabled to grind already set teeth while the teeth remain in the articulator so that they shall operate smoothly when completed and used in a natural manner, which articulator shall be capable of being adjusted as to distance between jaws and permit of the usual forward or backward movements besides the rotary movement above referred to, which shall not be costly to produce, and which shall be durable and economical in use.

With the above-mentioned and other objects in view, the invention consists in an articulator and grinder of novel construction, including means enabling an operator to give the teeth of one jaw rotary movement corresponding to the rotary movement on the plane of mastication of a human jaw relatively to the opposite jaw, permitting the grinding of teeth in the articulator, the articulator being so constructed as to insure proper occlusion of the teeth; and, the invention consists also further in the novel parts and in the combinations and arrangements of parts as hereinafter particularly described and further defined in the accompanying claims.

Figure 4:
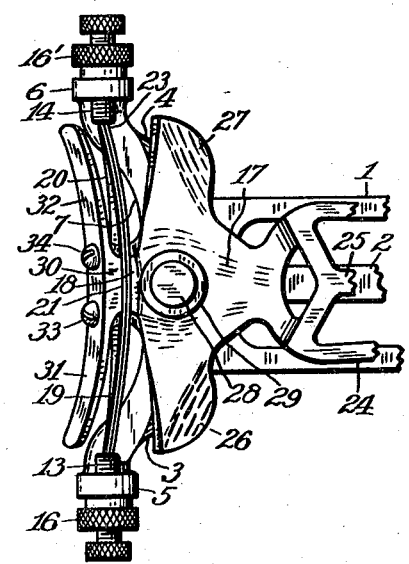
Figure 2:
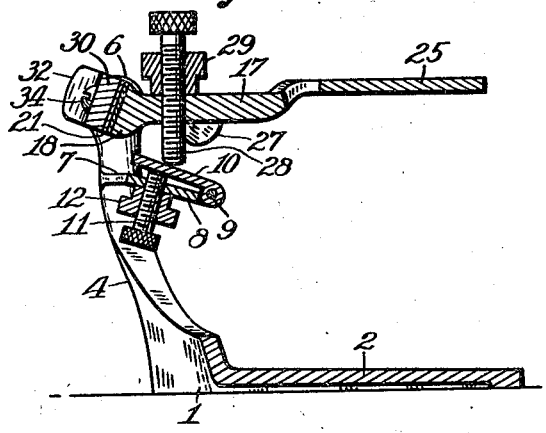
Figure 5:
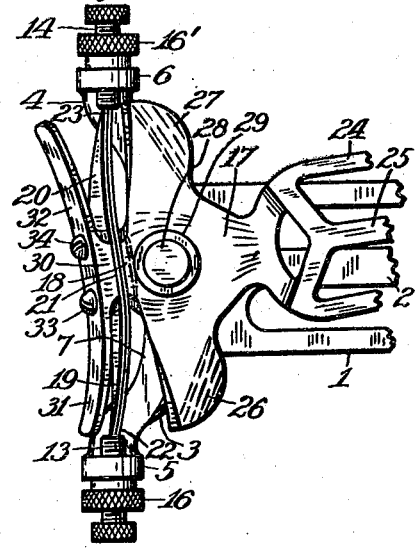
Figure 3:
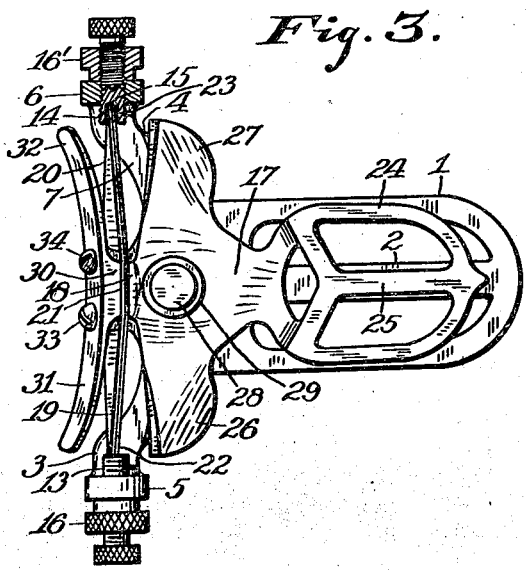

Referring to the drawings,—Figure 1 is a perspective view of an apparatus constructed substantially in accordance with the invention and having two sets of artificial teeth mounted therein; Fig. 2 is a vertical sectional elevation approximately on the median line of the articulator; Fig. 3 is a top plan of the articulator in which the several parts rest in normal position; Fig. 4 is a top plan of the articulator showing the upper jaw thereof as having been moved forward relatively to the lower jaw; Fig. 5 is a top plan of the articulator showing the upper jaw thereof as having been moved slightly forward and turned laterally relatively to the lower jaw, as in a grinding movement.

In the different figures of the drawings corresponding or like reference characters indicate corresponding elements or features of construction herein referred to in detail.

The invention as preferably constructed comprises two jaws, and for the convenience of the operator a lower jaw 1 is provided which is designed to serve as a base for supporting the articulator, the main portion of the jaw being apertured and preferably so as to have a longitudinal or median bar 2. The rearward portion of the jaw includes a pivot stand which is preferably composed of two arms 3 and 4 extending upwardly and having internally screw-threaded ears 5 and 6 thereon respectively, the arms supporting a bridge 7 having a guide plate 8 which preferably has a pivot 9 on its forward portion to which an adjustable member 10 of the guide plate is connected. An adjusting screw 11 extends upward through the bridge and supports the member 10, the screw preferably having a lock nut 12 thereon. As constructed the angularity of the effective top of the guide plate may be readily varied. When not desired the adjustable member and its adjusting screw may be omitted. The ears 5 and 6 are provided with suitable pivot bearings which preferably consists of screws 13 and 14 inserted in the ears so as to be adjustable each with respect to the other, each screw having a bearing socket 15 in its inner end. Preferably the screws are provided with lock nuts 16 and 16', respectively. An upper jaw having novel features is provided which comprises a body portion 17 having a projection 18 on the middle of its rear end for seating and directly supporting the jaw bodily, the face of the projection preferably being inclined so as to be acute angled relatively to the plane of the bottom of the upper jaw. A novel pivot bar is provided which has two alining members or arms 19 and 20 integral with a relatively broad and flat middle body portion 21 that has two flat sides and is suitably fixed to the inclined face of the projection 18, and the arms are mainly flat and have tapered bearing portions 22 and 23 that are rotatively arranged in the sockets of the screws 13 and 14, respectively. The pivot bar is composed preferably of plate spring metal, being laterally elastic and in some cases may be laminated, and if desired the members or arms 19 and 20 may be composed of separate pieces connected to the projection 18. The body portion 17 has a forwardly extending plate 24 having apertures preferably arranged to provide a longitudinally central or median bar 25. The body portion 17 has also two wings designed to constitute thumb levers 26 and 27 on opposite sides thereof respectively, the forward portions of the wings extending downwardly. An adjusting screw 28 is arranged in the body portion 17 and operates on the top of the guide plate or its adjustable member and preferably has a lock nut 29 thereon seated upon the top of the body portion. The thumb levers enable the operator to force the upper jaw rearward and to swing it laterally, and the jaw may be moved forwardly and also laterally by pressing the members or arms 19 and 20 with the fingers. Preferably, for convenience and efficiency in operation, a center piece 30 is arranged on the outer flat side of the pivot bar, opposite to the projection 18, and it has finger levers 31 and 32 thereon that extend horizontally and are curved away from the arms 19 and 20 respectively, the center piece being fixedly secured in place by means of screws 33 and 34 or otherwise as may be desired.

When the articulator is prepared for use the lower jaw has a plaster foundation 35 thereon which supports dental wax 36 in which artificial teeth 37 are set, the upper jaw having plaster 38 secured thereto which carries dental wax 39 in which teeth 40 are set, the various processes leading to this stage being well known in the practice of dentistry, or may be varied or modified in accordance with possible improved practice.

In practical use the operator when setting the teeth may move the upper jaw about in imitation of the movements of the human jaws and ascertain whether or not one set of teeth operates naturally and smoothly upon the opposite set, and if necessary may adjust any of the teeth, and the upper jaw may be swung back on its pivot when desired. Contact impressions may be made as is customary on thin material between the sets of teeth to ascertain where inaccuracy should be corrected either by slightly moving a tooth further into or outward in the wax or grinding off any interfering protuberances of the tooth. The operator will facilitate tests by holding the lower jaw in his hands, extending his fingers around the arms 3 and 4 to the finger levers 31 and 32, placing his thumbs on the thumb levers or wings 26 and 27, thus enabling him to have delicate control of the upper jaw which may be readily moved as may be desired with the teeth on the plane of mastication. Drawing against the finger levers equally causes the forward movement of the upper jaw, and because of the angularity of the pivot bar the upper jaw is forced slightly to the lower jaw. When either one of the finger levers is pressed forward the jaw is moved laterally and slightly rocked so as to follow approximately a spheroidal curve or the natural curve of the plane of mastication, similar actions being obtained when either one of the thumb levers or wings is pushed backward and downwardly, the upper jaw being moved straight rearward when both of the thumb levers are equally pressed backward. When one of the thumb levers 27 is forced rearward and the finger lever 31 forced forward the upper jaw turns as on a pivot at the middle of the body portion 21 of the pivot bar, as illustrated in Fig. 5, so that the upper jaw may be oscillated when desired as on a fixed pivot, but, as will be seen, the pivotal point may be shifted to reproduce the various movements of the human mandible by varying the pressure on the various control levers, so that the natural curve of the plane of mastication may be followed. When it is desired or necessary to grind the teeth, which may be done most accurately while the teeth remain in the jaws after having been properly set, suitable grinding paste is applied to the teeth and the upper jaw of the articulator is operated to produce compound movement as above explained, resulting in highly satisfactory sets of artificial teeth or portions of sets. The spheroidal curve may be slightly varied when desired by manipulating the screw 11 to change the inclination of the guide plate 10, and the screw 28 may be readjusted as occasion may require.

Having thus described the invention, what is claimed as new is:

1. An anatomical articulator having a jaw provided on the middle of its rear end with a seat portion to directly support the jaw bodily, another jaw having two arms provided with bearing devices respectively, and an approximately straight laterally elastic pivot bar having two ends bodily supported by the bearing devices respectively, the middle portion of the pivot bar being connected to and directly supporting said seat portion.

2. An anatomical articulator including two jaws oppositely arranged, one of the jaws being provided with two oppositely arranged pivot bearings, the opposite one of the jaws having a seat portion centrally on its rear end to directly support the jaw bodily, two alining pivot arms rigidly secured to the seat portion of the jaw and rotatively connected with the pivot bearings respectively, each arm having a flat laterally elastic main portion, one of the jaws having a guide plate thereon and the opposite jaw having an adjusting screw to operate against the guide plate.

3. An anatomical articulator including a lower jaw, an upper jaw provided with two flat laterally elastic pivot bars and also two thumb-levers to flex the bars forward of the pivot bars respectively, the pivot bars having rotative support on the lower jaw and bodily supporting the upper jaw, and cooperating adjusting means to regulate the pivotal movement of either one of the jaws towards the other jaw.

4. An anatomical articulator including a lower jaw having two upwardly-extending arms and a bridge supporting an adjustable guide plate between the arms, a laterally elastic pivot bar rotatively supported by the arms, an upper jaw having a rearward projection secured to the middle portion of the pivot bar, and an adjusting screw arranged in the upper jaw to operate upon the guide plate.

5. An anatomical articulator including a lower jaw having two arms, a bridge supported by the arms, a guide plate hinged to the forward portion of the bridge, an adjusting screw arranged in the bridge and adjustably supporting the guide plate at different angles, an upper jaw pivotally connected with said arms with a laterally elastic pivot bar and having a forward or rearward movement relatively to the lower jaw, and an adjusting screw arranged in the upper jaw and operating on said guide plate.

6. An anatomical articulator including a lower jaw having two arms and a guide plate, a flat laterally elastic pivot bar rotatively supported by the arms, an upper jaw having a projection on the middle of its rear end, the projection having an end face that is acute-angled relatively to the under side of the jaw and secured to one of the flat sides of the middle portion of the pivot bar, and an adjusting screw arranged in the upper jaw and operating upon the guide plate.

7. An anatomical articulator including a lower jaw having two arms, two alining bearing screws arranged in the arms respectively and having each a bearing socket in its inner end, a bridge supported by said arms and having a guide face thereon, an upper jaw having two alining pivot arms on its rear end composed of flat spring metal set with the flat sides on an acute angle relatively to the plane of the under side of the upper jaw, the pivot arms having tapered bearing portions arranged in said sockets respectively, the upper jaw having also two thumb-levers on opposite sides respectively thereof forward of the pivot arms and having downwardly-extending forward portions, two finger-levers fixed to the base portions of the pivot arms respectively and extending outwardly and gradually away from the arms, and an adjusting screw arranged in the upper jaw to operate upon said guide face.

8. In an anatomical articulator, the combination with a lower jaw having pivot supports, and an upper jaw to cooperate with the lower jaw, of a flat laterally elastic pivot bar rotatively supported by the pivot supports and connected to and supporting the upper jaw.

In testimony whereof, I affix my signature in presence of two witnesses.

ALBERT STANLEY.

Witnesses:
  E. T. SILVIUS,
  ROBERT LIEBRICH.